United States Patent [19]
Wang et al.

[11] Patent Number: 5,959,054
[45] Date of Patent: Sep. 28, 1999

[54] POLYMERIC SULFIDE MINERAL DEPRESSANTS

[75] Inventors: Samuel S. Wang, Cheshire; Devarayasamudram R. Nagaraj, Stamford, both of Conn.

[73] Assignee: Cytec Technology Corp., Wilmington, Del.

[21] Appl. No.: 08/989,062

[22] Filed: Dec. 11, 1997

Related U.S. Application Data

[63] Continuation of application No. 08/625,263, Mar. 28, 1996, Pat. No. 5,756,622.

[51] Int. Cl.$^6$ .................................................. C08T 226/02
[52] U.S. Cl. ............................................................ 526/288
[58] Field of Search ............................................. 526/288

[56] References Cited

U.S. PATENT DOCUMENTS

| | | | |
|---|---|---|---|
| 4,744,893 | 5/1988 | Rothenberg | 209/167 |
| 4,866,150 | 9/1989 | Lipp | 526/288 |
| 4,888,106 | 12/1989 | Lipp | 209/167 |
| 4,902,764 | 2/1990 | Rothenberg | 526/240 |

*Primary Examiner*—Christopher Henderson
*Attorney, Agent, or Firm*—Frank M. Van Riet; Joseph J. Mallon

[57] ABSTRACT

Novel depressants for depressing sulfide minerals during froth floatation of ores to recover value minerals are disclosed, as well as a method for their use in the froth flotation. The novel depressants are terpolymers of a (meth) acrylamide, an allyl thiourea and a hydroxyalkyl(meth) acrylate.

1 Claim, No Drawings

POLYMERIC SULFIDE MINERAL DEPRESSANTS

This application is a continuation of application Ser. No. 08/625,263 U.S. Pat. No. 5,756,622 filed Mar. 28, 1996.

BACKGROUND OF THE INVENTION

One of the major factors in the froth flotation of ores is to provide value mineral concentrations which have as low levels of gangue minerals as possible. When sulfide ores are used, for example, flotation concentrates are transported directly to smelting without additional processing and therefore major concentrations of gangue contaminants therein result in the production of sulfur waste products and $SO_2$ atmospheric pollution which are detrimental to the environment. The problem is becoming so prevalent that smelters are willing to sacrifice the value mineral concentration of feeds if the gangue sulfide concentration is also lower.

It has now been found that certain synthetic polymers containing a combination of certain functional groups are very effective depressants for the separation of certain value minerals from other value minerals and/or from gangue minerals, in general, and pyrite, pyrrhotite and other gangue sulfides, in particular. These depressants result in a substantial reduction of the gangue minerals contamination of mineral concentrates which are transported to the smelter thereby, especially in the case of sulfide mineral concentrates, having a positive effect on the environmental impact of the smelting operation. The term "gangue", as used herein, may include the so-called penalty elements such as arsenic and antimony, especially as sulfides.

U.S. Pat. No. 4,866,150 is directed to novel copolymers and terpolymers of an acrylamide and a thiourea which are taught as depressants for gangue sulfide minerals whereas U.S. Pat. No. 4,888,106 claims the use of those polymers in the beneficiation of value sulfide minerals.

U.S. Pat. No. 4,744,893 claims a method for beneficiating value sulfide minerals using a depressant comprising a terpolymer of an acrylamide, a hydroxyl group containing monomer and an acrylic acid or salt. The polymer per se is claimed in U.S. Pat. No. 4,902,764.

SUMMARY OF THE INVENTION

The present invention is directed to a novel terpolymer comprising recurring units of an acrylamide, a thiourea and a hydroxyl group containing (meth)acrylate monomer which terpolymer has been found to provide excellent benefication of value minerals with the corresponding unexpectedly superior rejection of gangue minerals and/or separation of value minerals from one another.

DESCRIPTION OF THE INVENTION INCLUDING PREFERRED EMBODIMENTS

In accordance with the present invention, new and useful terpolymers are provided, said terpolymers comprising recurring units of the formula:

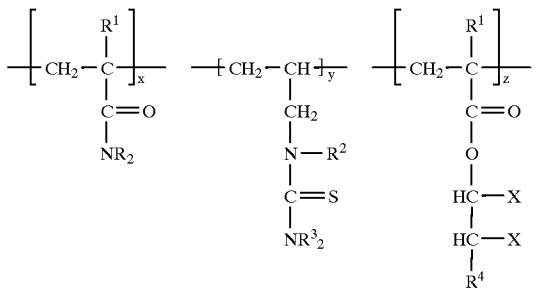

wherein each R is individually hydrogen or a $C_1$–$C_4$ alkyl group, each $R^1$ is, individually, hydrogen or methyl, $R^2$ is hydrogen or a $C_1$–$C_4$ alkyl group, each $R^3$ is, individually, hydrogen or a $C_1$–$C_4$ alkyl group, $R^4$ is hydrogen or a $C_1$–$C_4$ alkyl group, each X is, individually, hydrogen or a hydroxyl group with the proviso that at least one X is hydroxyl group, x is a mole fraction ranging from about 60% to about 98%, y is a mole fraction ranging from about 1% to about 20% and z is a mole fraction ranging from about 1% to about 20% and the molecular weight of the polymer ranges from about 1000 to about 2 million.

Preferably, the molecular weight of the terpolymer ranges from about 5,000 to about 500,000, x is a mole fraction ranging from about 70 to about 90%, y is a mole fraction ranging from about 5 to about 15% and z is a mole fraction ranging from about 5 to about 15%.

In preferred embodiments, the terpolymers of the above formula are those wherein the terpolymer comprises x units of acrylamide, y units of allyl thiourea and z units of hydroxyethyl methacrylate or dihydroxypropyl methacrylate.

These new terpolymers may be prepared by polymerization methods taught in the art, e.g. U.S. Pat. Nos. 3,002,960; 3,255,142, etc., hereby incorporated herein by reference. More particularly, they are prepared by copolymerizing the appropriate monomers at a temperature of from about 40° C. to about 100° C., preferably from about 55° C. to about 70° C., under adiabatic or isothermal conditions and in the presence of an appropriate catalyst such as a peroxide, azo or redox system.

More particularly, the polymers of this invention comprise as the (x) units, those derived from acrylamide per se, alkyl acrylamides such as methacrylamide, etc., and N-substituted acrylamide and methacrylamides such as N,N'-dimethylacrylamide, etc.

The (y) units of the polymer defined above are derived from thiourea derivatives such as allyl thiourea, N-allyl-N'-methyl thiourea, N-allyl-N'-benzoyl thiourea, N-allyl-N-methyl,-N',N'-dimethyl thiourea and like.

The (z) units of the terpolymer are derived from hydroxyl group containing monomers including the hydroxyalkyl acrylates and methacrylates such as hydroxyethyl acrylate, hydroxyethyl methacrylate, dihydroxypropyl acrylate, dihydroxypropyl methacrylate, hydroxybutyl acrylate, hydroxypentyl acrylate, hydroxyhexyl acrylate, hydroxybutyl methacrylate, hydroxypentyl methacrylate, hydroxyhexyl methacrylate, dihydroxyethyl acrylate, dihydroxyethyl methacrylate, dihydroxybutyl acrylate, dihydroxybutyl methacrylate, dihydroxypentyl acrylate, dihydroxypentyl methacrylate, dihydroxycyclohexylacrylate, dihydroxyhexyl methacrylate and the like.

The polymers may contain small amounts, i.e., a mole fraction of less than about 5% of other copolymerizable comonomers, e.g. acrylic acid, or groups occurring as a result of post reaction of the terpolymer, e.g. hydrolysis of the x units to carboxyl containing groups.

The novel terpolymers of the present invention may be used in flotation processes for important separations; for example, copper from molybdenite by depressing the former; lead and copper sulfides from pyrite and sphalerite by depressing the latter; pentlandite from pyrrhotite by depressing the latter; copper sulfides or sphalerite from pyrite by depressing the latter, etc.

In another aspect, the present invention provides a new and improved method for the beneficiation of value minerals from ores with selective rejection of gangue minerals or the separation of value minerals from one another, said method comprising:

(a) providing an aqueous pulp slurry of finely divided, liberation-sized ore particles which contain said value and gangue minerals;

(b) conditioning said pulp slurry with an effective amount of gangue depressant, a value mineral collector and a frothing agent, said depressant comprising a polymer comprising:

(i) x units of the formula:

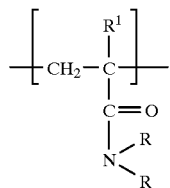

(ii) y units of the formula:

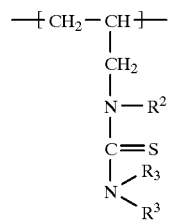

(iii) z units of the formula:

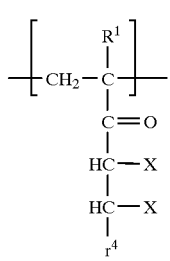

wherein each R is, individually, hydrogen or a $C_{1-C_4}$ alkyl group, each $R^1$ is, individually, hydrogen or methyl, $R^2$ is hydrogen or a $C_1$–$C_4$ alkyl group, each $p^3$ is, individually, hydrogen or a $C_1$–$C_4$ alkyl group, $R^4$ is hydrogen or a $C_{1-C_4}$ alkyl group, each X is, individually, hydrogen or a hydroxyl group with the proviso that at least one X is a hydroxyl group, x is a mole fraction ranging from about 60% to about 98%, y is a mole fraction ranging from about 1% to about 20%, z is a mole fraction ranging from about 1% to about 20% and the molecular weight of the polymer ranges from about 1,000 to about 2 million, and c) subjecting the conditioned pulp slurry to froth flotation and collecting the value mineral having a reduced content of gangue or other value mineral.

Preferably, the molecular weight of the terpolymer ranges from about 5,000 to about 500,000, x is a mole fraction ranging from about 70% to about 90%, y is a mole fraction ranging from about 5% to about 15% and z is a mole fraction ranging from about 5% to abut 15%.

The new and improved method of beneficating value minerals by froth flotation procedures employing the synthetic depressants in accordance with this invention provides excellent metallurgical recovery with significant improvements in grade. The novel mineral depressants are effective over a wide range of pH and dosage, for example, from about 0.01 lb./ton to about 5.0 lbs./ton. The depressants are compatible with available frothers and mineral collectors and may be readily incorporated into any currently operating system or facility. Moreover, use of the polymeric mineral depressants, when employed with sulfide ores, can significantly reduce $SO_2$ emissions from smelting operations by reducing the amount of gangue sulfide minerals which remain in the value sulfide concentrate to be smelted.

Furthermore, other chemicals with strongly reducing or oxidizing (in certain minerals systems) properties can be used in conjunction with the novel polymers to obtain appropriate redox conditions. In other words, any "surface-modifying" agent can be used to prepare the sulfide surfaces to enhance adsorption of the novel depressant polymers. Examples of such reagents include NaCN, Nokes reagent, mercaptoethanol, thioglycolic acid, Na or K ferri and ferro cyanides, hydroxyethyltrithiocarbonates, and other trithiocarbonates, hydrogen peroxide, ozone, air, oxygen, sulfur dioxide, zinc cyanide, arsenic Nokes, mercaptopropionic acid, mercaptosuccinic acid, other related mercapto acids, 2-thiouracil, thioglycerol and the like. Additional compounds that can be used in conjunction with the novel polymer are given in the publication Nagaraj et al, Trans. IMM, Vol. 95, March 1986, pp. C17. Ratios of these surface modifying agents to the novel polymer hereof range from about 0.05–5.0:1, respectively, preferably about 0.02–2.0:1, although conditions of use and ores treated may vary these amounts somewhat.

The present invention is preferably directed to the selective separation of sulfides, for example, gangue sulfides, from copper ores, complex sulfide ores, etc., containing lead, copper, zinc, silver, gold, etc, nickel and nickel-cobalt ores, gold ores and gold-silver ores and to facilitate copper-molybdenum, copper-lead, lead-zinc, copper-zinc separations, etc.

The following examples are set forth for purposes of illustration only and are not to be construed as limitations on the present invention, except as set forth in the appended claims. All parts and percentages are by weight unless otherwise specified.

EXAMPLE 1

To a suitable 5-neck reaction vessel equipped with a mechanical stirrer, a condenser and a thermometer are charged 22.4 parts of a 33% N-allyl thiourea in a 1:1 isopropanol/water solution (7.4 parts) and 140 parts of water. The pH of the mixture is adjusted to 6.0 to 7.0 with 20% sulfuric acid followed by the addition of 0.32 part of $CuSO_4.5H_2O$.

The mixture under agitation is heated to 55° C. At 55° C., 20 cc each of 19.4% ammonium persulfate and 16.9% sodium metabisulfite, respectively, is fed simultaneously with a syringe pump at a rate of 0.11 cc/min. Ten minutes after the redox catalyst's feeding, the feeding of a mixture of 8.4 parts (0.064 mole) of hydroxyethyl methacrylate and 159 parts of 52% acrylamide (1.16 moles) is also begun at a rate of 1.7 gm per minute. The polymerization is continued at 55° C. until at least 95% conversion of monomer is reached based on dodecylmercaptan/iodine titration (2–4 hours).

The pH of finished copolymer solution is adjusted to 6.0–7.0 with at 20% NaOH.

EXAMPLE 2

The procedure of Example 1 is again followed except that the hydroxyethyl methacrylate is replaced by dihydroxypropyl methacrylate. Similar results are achieved.

EXAMPLES 3–7

The procedure of Examples 1 and 2 are again followed. The compositions prepared are shown in Table I, below.

EXAMPLES 8–10

Flotation tests are carried out on a North African zinc ore. Pulp samples are taken from the plant and evaluated in a laboratory float machine. The laboratory procedure includes the steps of 1) adding copper sulfate solution to the float cell to activate the zinc minerals followed by conditioning for one minute, 2) adding flotation collector-potassium amyl xanthate (PAX) and conditioning for one minute 3) adding a solution of the polymeric depressant in water to the float cell followed by one minute of conditioning, and 4) aerating to affect flotation of the floatable minerals and collecting the flotation product and tails. Analysis of the flotation concentrate and tails demonstrates improved zinc grade especially in the rougher stage of flotation with the polymer of Example 1, versus either the control test without any depressant or the test with an AMD/HEM copolymer. The slight loss in Zinc recovery is inevitable since some of the Zn mineral is mineralogically locked with gangue sulfide minerals.

TABLE II

| | Collector | | Depressant | | | Zinc Recovery | | Zinc Grade | |
|---|---|---|---|---|---|---|---|---|---|
| Example No. | Type | Dosage, parts/Ton | Type | Dosage, parts/Ton | pH | Rougher | Rougher + Scavenger | Rougher | Rougher + Scavenger |
| 8C | PAX | 112 | None | — | 10.8 | 66.8 | 99.1 | 42.2 | 19.1 |
| 9C | PAX | 109 | AMD/HEM | 334 | 10.4 | 83.0 | 99.1 | 39.7 | 21.1 |
| 10 | PAX | 115 | AMD/HEM/ATU | 353 | 10.5 | 69.7 | 96.7 | 48.2 | 23.0 |

C = Comparative
AMD/HEM = Acrylamide/Hydroxyethyl methacrylate copolymer (90/10); wt. ave. m.w. = 10K
AMD/HEM/ATU = Acrylamide/Hydroxyethyl methacrylate/Allyl thiourea terpolymer (90/5/5); wt. ave. m.w. = 5K

TABLE I

| Example | x Units | y Units | z Units |
|---|---|---|---|
| 3 | $R^1$ = H<br>each R = H | $R^2$ = H<br>each $R^3$ = $CH_3$ | $R^1$ = H<br>$R^4$ = H<br>both X = OH |
| 4 | $R^1$ = H<br>each R = $CH_3$ | $R^2$ = H<br>each $R^3$ = H | $R^1$ = $CH_3$<br>$R^4$ = H<br>one X = OH |
| 5 | $R^1$ = $CH_3$<br>each R = H | $R^2$ = H<br>each $R^3$ = H | $R^1$ = H<br>$R^4$ = $C_2H_5$<br>one X = OH |
| 6 | $R^1$ = H<br>each R = $C_2H_5$ | $R^2$ = H<br>each $R^3$ = H | $R^1$ = H<br>$R^4$ = H<br>one X = OH |
| 7 | $R^1$ = H<br>each R = H | $R^2$ = $CH_3$<br>each $R^3$ = $CH_3$ | $R^1$ = $CH_3$<br>$R^4$ = $CH_3$<br>both X = OH |

EXAMPLES 11–14

On another sample of pulp from the same plant as in Examples 8–10, the polymer of Example 1 is compared to copolymers of acrylamide with allyl thiourea and of acrylamide with dihydroxypropyl methacrylate. The Example 1 polymer gives significantly better zinc grades in the rougher stage than either the control or the dihydroxypropyl methacrylate copolymer or the allyl thiourea copolymer. Indeed, the zinc rougher concentrate obtained with the polymer of Example 1 is of sufficiently high grade (53%) to bypass the cleaning circuit and report directly as the final value product. Thus, 64% of the zinc in the original feed can bypass the cleaning circuit. This is a major bypass benefit. Note also that a pH of 10.5 is used with polymer of Example 1, whereas a pH of 12.3 is typically necessary to obtain high concentrate grades in the absence of the polymeric depressant. Thus substantial savings in line cost can be achieved when using the polymer of Example 1.

TABLE III

| | Collector | | Depressant | | | Zinc Recovery | | Zinc Grade | |
|---|---|---|---|---|---|---|---|---|---|
| Example No. | Type | Dosage, parts/Ton | Type | Dosage, parts/Ton | pH | Rougher | Rougher + Scavenger | Rougher | Rougher + Scavenger |
| 11C | PAX | 87 | None | — | 12.3 | 72.0 | 99.0 | 45.7 | 36.7 |
| 12C | PAX | 87 | AMD/ATU | 269 | 10.5 | 63.3 | 94.8 | 50.4 | 43.7 |
| 13C | PAX | 82 | AMD/DHPM | 253 | 10.5 | 70.8 | 97.8 | 44.7 | 32.7 |
| 14 | PAX | 88 | AMD/HEM/ATU | 271 | 10.5 | 64.3 | 91.3 | 53.0 | 43.8 |

C = Comparative

TABLE III-continued

|  | Collector | | Depressant | | | Zinc Recovery | | Zinc Grade | |
|---|---|---|---|---|---|---|---|---|---|
| Example No. | Type | Dosage, parts/Ton | Type | Dosage, parts/Ton | pH | Rougher | Rougher + Scavenger | Rougher | Rougher + Scavenger |

AMD/DHPM - Acrylamide/Dihydroxypropyl methacrylate compolymer (90/10) wt. ave. m.w. = 10K
AMD/ATU = Acrylamide/Allyl Thiourea copolymer (90/10); wt. ave. m.w. = 5K
AMD/HEM/ATU - Acrylamide/Hydroxyethyl methacrylate/Allyl Thiourea Terpolymer (90/5/5); wt. ave. m.w. = 5K

EXAMPLES 15–17

On a third pulp sample from the same North African mine, as in Examples 8–10, the polymer of Example 1 is compared with a control and an acrylamide/hydroxyethyl methacrylate copolymer. Significantly better zinc grades are obtained with only a small loss in zinc recovery, especially in the rougher flotation stage. Again, the rougher zinc concentrate is sufficiently high in grade to bypass the cleaner circuit and qualify as the final product, which is a major benefit for the operating plant. The small loss in zinc recovery is inevitable due to locking of some zinc mineral with iron sulfides.

TABLE III

|  | Collector | | Depressant | | | Zinc Recovery | | Zinc Grade | |
|---|---|---|---|---|---|---|---|---|---|
| Example No. | Type | Dosage, parts/Ton | Type | Dosage, parts/Ton | pH | Rougher | Rougher + Scavenger | Rougher | Rougher + Scavenger |
| 15C | PAX | 134 | None | — | 12.3 | 60.7 | 99.1 | 47.2 | 26.6 |
| 16C | PAX | 148 | AMD/ATU | 455 | 10.5 | 68.0 | 95.4 | 47.0 | 33.5 |
| 17 | PAX | 122 | AMD/HEM/ATU | 377 | 10.5 | 62.8 | 94.4 | 53.1 | 29.0 |

C = Comparative
AMD/ATU = Acrylamide/Allyl Thiourea copolymer (90/10); wt. ave. m.w. = 5K
AMD/HEM/ATU = Acrylamide/Hydroxyethyl methacrylate/Allyl Thiourea Terpolymer (90/5/5); wt. ave. m.w. = 5K

EXAMPLES 18–22

Following the procedure of Example 10, the polymers of Examples 3–7 are individually substituted for the polymer used therein. Similar results are achieved.

In certain cases, sulfide mineral depressants are needed to separate them from non-sulfide minerals in either sulfide ores or non-sulfide ores. Some examples of these separations are: rejection of gangue sulfide minerals such as pyrite from coal; rejection of gangue sulfides from value oxide type minerals such as cassiterite; recovery of value sulfide minerals such as those of base metals from gangue non-sulfide minerals such as silica, silicates, carbonates, etc., by depressing the sulfide minerals and floating the non-sulfide minerals.

EXAMPLE 23

The polymer of Example 1 is evaluated as a depressant for the rejection of iron sulfides, e.g. such as pyrite during the beneficiation of coals. Selective depression of sulfides is achieved.

EXAMPLE 24

The polymer of Example 1 is also evaluated as a depressant for the bulk of the value sulfides, e.g. those of copper, nickel, and iron, and the subsequent flotation separation of gangue non-sulfide minerals, e.g. silica and silicates. Bulk sulfides depression is achieved and the gangue non-sulfides are floated away using fatty acid or amine collectors.

EXAMPLE 25

The polymer of Example 1 is also evaluated as a depressant for the gangue sulfides present in a tin ore during the flotation separation of value tin minerals, e.g. cassiterite. Again bulk sulfides depression is achieved while the value non-sulfide mineral cassiterite is floated using sulfonate or sulfosuccinate collectors.

polymers of the present invention can also be used in other separations involving depressing of sulfide minerals in many types of sulfide and non-sulfide ores.

We claim:

1. A polymer composition comprising recurring units of acrylamide, recurring units of allyl thiourea, and recurring units of hydroxyethyl acrylate, wherein the mole fraction of said acrylamide recurring units in said polymer ranges from about 60% to about 98%, the mole fraction of said allyl thiourea recurring units ranges from about 1% to about 20%, and the mole fraction of said hydroxyethyl acrylate recurring units ranges from about 1% to about 20%, and wherein the molecular weight of said polymer ranges from about 1,000 to about 2 million.

\* \* \* \* \*